Figure 1:
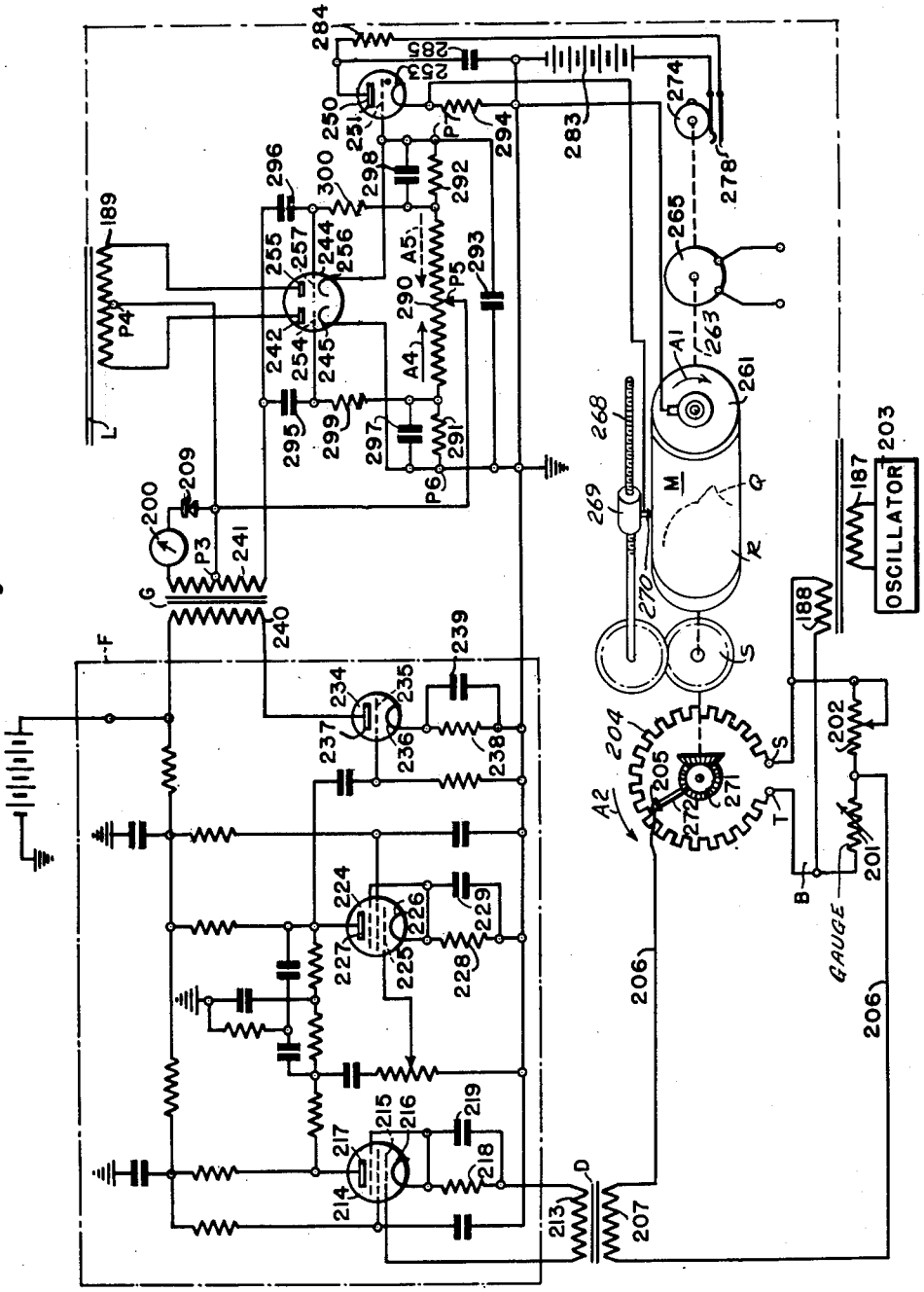

Sept. 4, 1951  G. KEINATH ET AL  2,566,420
ELECTRONIC RELAY SYSTEM
Filed April 23, 1947  2 Sheets-Sheet 1

INVENTORS
George Keinath &
Reinhold K. Hellmann.
BY
ATTORNEY

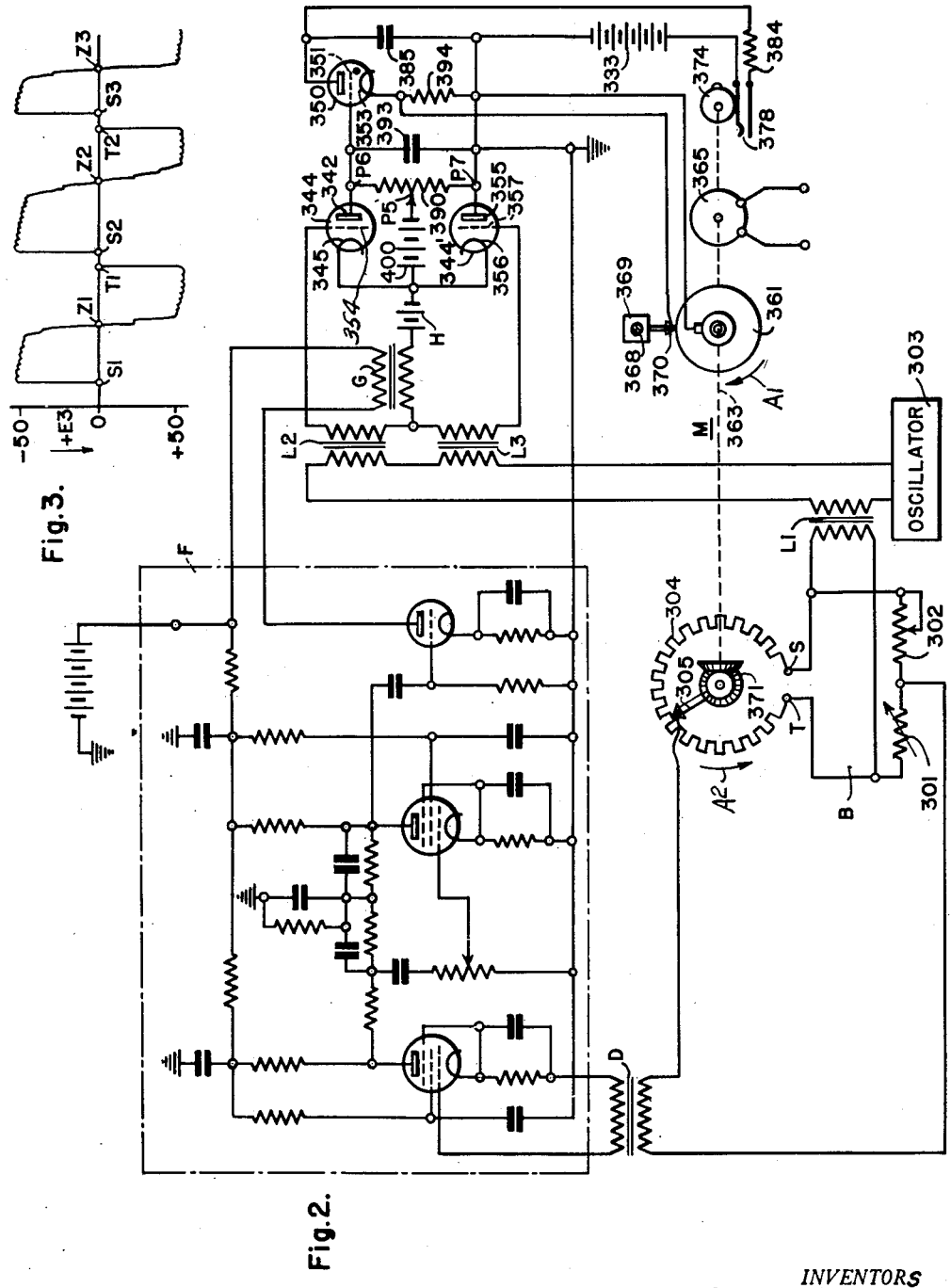

Patented Sept. 4, 1951

2,566,420

UNITED STATES PATENT OFFICE 2,566,420

ELECTRONIC RELAY SYSTEM

George Keinath, Larchmont, N. Y., and Reinhard K. Hellmann, Meriden, Conn.; said Hellmann assignor to Great American Industries, Incorporated, Meriden, Conn., a corporation of Delaware Application April 23, 1947, Serial No. 743,284
In Great Britain April 29, 1946

8 Claims. (Cl. 177—351)

This invention relates to electronic systems and apparatus for performing a measuring, indicating, recording, controlling, regulating or the like operation in dependence upon the variations of a phenomenon under observation. More in particular, this invention is concerned with control systems in which a condition-responsive variation is imposed on an alternating voltage of a given frequency and thus converted into a modulated alternating voltage whose envelope curve is indicative of the variations under observation and in which this modulated voltage, upon amplification, is applied to an electronic relay thus causing or governing the performance of apparatus or mechanisms controlled by the relay. Systems and apparatus of this kind are generally known from the article The Keinath Recorder, Instruments, April 1946, pages 200 to 210.

It is an object of the invention to improve such systems as regards accuracy, reliability and stability of operation. Another object, ancillary to the one mentioned, is to provide a trigger system whose effective trigger voltage varies through a considerably increased range and/or changes its polarity during the triggering performance.

These and other objects and the essential features of the invention will be apparent from the following description taken in conjunction with the drawing in which Figures 1 and 2 are circuit diagrams of two embodiments of the invention, each representing the electrical and mechanical elements of a recording apparatus equipped with a polarized electronic trigger system for controlling the marking operation of a recorder mechanism, while Fig. 3 is explanatory and shows a voltage-time diagram of the trigger voltage effective in systems according to Fig. 1 or Fig. 2.

In the embodiment illustrated in Fig. 1, a measuring circuit B of the Wheatstone bridge type contains a resistance gauge 201 or other condition-responsive member in one branch and a calibrating standard resistor 202 in another branch, while the two other branches are formed by a rheostat 204 with an appertaining slider 205. The bridge B is energized from an oscillator 203 by alternating voltage of 1000 C. P. S. through a transformer L whose primary 187 acts on two secondary windings of which the one denoted by 188 is connected across the input diagonal points of the bridge B, while the other secondary 189 serves to energize the plate circuits of a polarized twin triode to be described in a later place. The output or zero diagonal 206 of the bridge circuit B includes the primary 207 of a transformer D whose secondary 213 is connected to the input circuit of an amplifier F. The voltage impressed through transformer D on the amplifier F represents a carrier wave (of 1000 C. P. S.) which is modulated by the regular cyclical change and reversal of amplitude caused by the movement of rheostat slider 205 so as to pass through a zero point during each modulating cycle, and which is also modulated by the zero-point displacing effect of the impedance variations of gauge 201.

The amplifier F has three stages and impresses the amplified voltage on the primary 240 of an output transformer G. The first tube of the amplifier is denoted by 214, its control grid by 215, its cathode and anode by 216 and 217 respectively, while 218 and 219 represent auxiliary impedance elements. The plate circuit of tube 214 is coupled by a capacitor and a current limiting resistor to the grid circuit of the next amplifier tube 224. Tube 224 has its electrodes 225, 226, 227 and the appertaining circuit elements 228, 229 designed and interconnected similar to the corresponding elements 215 to 219 of tube 214. Also similar to tube 214, the plate circuit of tube 224 is coupled to the grid circuit of the third tube 234 through a capacitor. The circuit elements of tube 234 are denoted by 235 through 239 in analogy to respective elements of the two preceding amplifier stages. The plate circuit of the last stage, representing the output circuit of the whole amplifier F, is connected to the primary winding 240 of a transformer G. The just-mentioned details of amplifier F are largely conventional and as such not part of the invention proper.

The amplified voltage appearing across the secondary 241 of output transformer G is applied to the grid circuits of a twin triode 244 whose rectified output voltage, in turn, is impressed on the grid circuit of a trigger tube 250 for controlling a recorder mechanism M.

The apparatus to be controlled is exemplified by a recording mechanism M serving to record the magnitude measured by gauge 201 as a function of some other reference magnitude, for instance as a function of time. Mechanism M has a revolvable electrode drum 261 for accommodating a recording chart of electrolytic or otherwise electroresponsive paper, for instance, as known under the trade name "Teledeltos" paper. The direction of drum revolution is indicated by an arrow A1. The shaft 263 of drum 261 is connected to a drive motor 265. A feed screw 268 is also driven from shaft 263. A carrier 269 in threaded engagement with screw 268 carries an insulated stylus electrode 270 and performs a translating motion along drum 261, such motion extending perpendicular to the plane of illustration. The screw 268 may be driven by a gear transmission S from the shaft 263. Shaft 263 drives also a gear 271 for rotating the arm 272 carrying the rheostat slider 205 so that the latter rotates in the direction of the arrow A2 synchronously with the revolution of drum 261. A cam 274, also driven by shaft 263, serves to periodically operate a switch 278 so as to charge a capacitor 285 (e. g. 2.5 microfarad) from a direct current source 283 (e. g. 400 volts) through a current limiting resistor 284 (e. g. 10 kilo ohms) during a short interval at the beginning of the slider travel. The capacitor 285 will then be discharged at the proper moment by the trigger action of the relay tube 250. The secondary 241 of transformer G has one of its terminals, denoted by P3, connected to the midpoint P4 of the secondary 189 of the carrier wave transformer L. The twin triode 244 (which may consist of a tube known as type 6SN7) has two separate discharge paths, one comprising the anode 242, cathode 245 and grid 254, and the other the anode 255, cathode 256 and grid 257. If desired, of course, two separate triodes may be used instead of the twin tube illustrated. The two anode 242 and 255 are connected to the terminals of the tapped transformer secondary 189. The two cathodes 245 and 256 are connected to the respective terminal points P6 and P7 of a series-connection of cathode follower resistors 290 (e. g. 5000 ohms), 291 and 292 (e. g. 1000 ohms each). The centrally located resistor 290 has a slider P5 connected to the secondary terminal P3 of transformer G. The resistors 290, 291 and 292 represent an impedance member composed of two series-connected sections which have a common intermediate point at P5 and two respective terminal points P6 and P7. A capacitor 293 (e. g. 0.1 microfarad) is connected across the terminal points P6 and P7 of the resistors. The rectified voltage appears across points P6, P7 and is impressed on the grid circuit of the relay tube 250 which can be traced from the grid 251 of tube 250 to point P7, through resistors 292, 290, 291 and 294 to the cathode 253 of the tube 250.

It will be recognized that during the operation of the system a polarizing alternating control voltage of the carrier frequency is impressed on each plate circuit of the twin rectifier 244 by the plate transformer winding 189. For instance, one of the plate circuits extends from anode 255 to a terminal of transformer winding 189, and from the midpoint P4 of the same winding to slider P5, thence through part of resistor 290 and through resistor 292 to cathode 256. However, since the two plate circuits are energized from differently polarized halves of winding 189, the two anode voltages are 180° phase displaced relative to each other.

In contrast thereto, the two grids 254 and 257 are impressed by modulated voltage of the carrier frequency in phase synchronism with each other. The grid circuits are both connected across the same winding portion of secondary 241 and extend from the lower terminal of winding 241 through phase-adjusting capacitors 295 and 296 (e. g. each of 0.1 microfarad) to the respective grids 254 and 257, and from terminal P3 of winding 241 to the slider P5 of the cathode follower resistors to the respective cathodes 245 and 256.

Due to the fact that the grid voltages are in phase, while the plate voltages are in phase opposition to each other, only one of the discharge paths can conduct at a time. For instance, when, during the first portion of a modulating cycle the grid voltages are in such phase relation to the anode voltages as to render the triode section between 242 and 245 conductive during each second half wave of the plate voltage, then this discharge will cease and the other triode section will become active as a half wave rectifier as soon as the modulated grid voltage reverses its phase. Since the modulated bridge voltage is derived from the output branch of a bridge circuit containing the gauge 201, and since the output voltage of an A.-C., bridge reverses its phase at the moment when the bridge passes through the balance condition, the magnitude measured by the gauge 201 determines the time point within each cycle at which the rectifying operation is shifted from one to the other triode section. If, for instance, the left triode section of tube 244 has grid and plate positive at the same time, the half waves conducted by the tube make point P6 positive with respect to point P5 while point P7 has substantially the potential of point P5 because no current is flowing through the right triode section of tube 244. The direction of current flow then corresponds to the arrow A4. The negative potential of point P7 is effective at grid 251 of relay tube 250, relative to the positive potential impressed on the cathode 253 from point P6 to block the flow of discharge current from capacitor 285 through the relay tube 250.

When, at the moment of phase reversal, the left triode section becomes non-conductive while the right triode section starts conducting half waves, the flow of rectified current in the resistor group reverses its direction as indicated by the arrow A5, and point P7 becomes positive relative to points P5 and P6. Hence, the grid 251 of relay tube 250 becomes positive with respect to cathode 253 so that the relay tube is fired and the capacitor 285 discharged through the recorder M to produce a mark on the record-receiving sheet. The resultant rectified voltage appearing between points P6 and P7 corresponds in type to the voltage diagram of Fig. 3.

In Fig. 3, the abscissa represents time, and the ordinate represents voltage in millivolts. Time points S1, S2, S3, etc. correspond to respective moments when the slider 205 (Fig. 1) starts a cycle of scanning motion at rheostat terminal point S, and time points T1, T2, T3, etc. represent the moments when the slider 205 reaches the end point of T of rheostat 204. In the intervals T1—S2, T2—S3, T3—S4 etc. (Fig. 3) the capacitor 285 (Fig. 1) is charged, and at the moments of zero passage Z1, Z2, Z3 etc. (Fig. 3), the capacitor is discharged to mark a dot on the chart on drum 261 (Fig. 1). At the beginning of a cycle, for instance at the moment S1 (Fig. 3) the rectified trigger voltage E assumes immediately a high value because the bridge circuit B is then highly unbalanced. The amplitude of the trigger voltage remains approximately constant, due to the current limiting characteristics of the amplifier grid circuits, and drops to a value of opposite polarity when the slider 205 passes through the balance position at the moment Z1. The discharge current, released at the moment Z1, Z2, Z3 etc. from capacitor 285, exhausts itself virtually instantaneously as compared with the cycle period of drum rotation so that a single point or dash appears on the record-receiving chart. Since the discharge moment Z1 coincides with that phase position of slider 205 and drum 261 which is indicative of the bridge balance and hence of the magnitude then measured by gauge 201, the position of the recording mark relative to the chart surface is also indicative of this magnitude. A series of marks thus produced forms a curve on the recording chart, such as the curve shown on the chart R shown in Fig. 1.

The capacitors 297 and 298 in Fig. 1 (e. g. each of 10 microfarad) and the resistors 299 and 300 (e. g. each of 500 ohms) serve filtering or smoothing purposes. The instrument 200, series connected with a rectifier 209 across a separate secondary section of transformer G, is a micro-ampermeter which may serve as a visual zero indicator to facilitate adjusting the measuring bridge circuit but does not represent a necessary requirement of the invention.

It will be noted that the twin triode 244 according to Fig. 1 operates as a half wave rectifier and that a sufficiently large capacitor 293 across the output terminals is required for filtering and smoothing purposes. If desired, of course, two twin triodes or equivalent tubes may be used in full-wave rectifier connection.

The system shown in Fig. 2 is in many respects similar to the one of Fig. 1 but is essentially distinguished therefrom in that the two rectifying discharge paths are plate-energized by a direct-current voltage and polarized by an alternating voltage impressed on the grid circuits. The elements 301, 302, 304, 305, the appertaining source 303 of a carrier voltage, the amplifier input transformer D, amplifier F, and amplifier output transformer G of the system are similar to the corresponding items of Fig 1 and hence require no further detailed description. The recording mechanism M shown in Fig. 7, and the appertaining parts 361, 363, 365, 368, 369, 370, 374 and 378 are likewise similar in design and operation to the corresponding parts of Fig. 5. The switch 378, periodically actuated by a cam 374, serves to charge a capacitor 385 from a voltage source 383 through a resistor 384, and the capacitor 385 is periodically discharged through the drum 361 and stylus electrode 370 of recorder M under control by a relay tube 350 whose grid is denoted by 351.

The polarized rectifier circuit interposed between amplifier F and relay tube 350 differs from the corresponding section of the preceding embodiments and is designed as follows.

The rectifier has two grid-controlled tubes 344 and 344', which if desired may be substituted by a twin tube. The anode, cathode and grid of tube 344 are denoted by 342, 345 and 354 respectively, and the corresponding three electrodes of tube 344' by 355, 356 and 357 respectively. The grid circuits of tubes 344 and 344' have in common a source H of a grid bias voltage which normally blocks the transfer of current through these tubes. The oscillator 303 or other source of the carrier voltage is not only connected, through transformer L1, to the bridge circuit B but imposes also, by transformers L2 and L3, two phase-opposed polarizing voltages on the respective grid circuits of tubes 344 and 344'. The amplifier output transformer G is secondarily connected to the common branch of the same grid circuits. Hence, the effects imposed on the two grid circuits by the amplified modulated voltage are in phase with each other.

The plate circuits of tubes 344 and 344' are energized by a direct-current source 400 and contain a load resistor 390 whose tap point P5 can be displaced for adjusting purposes. Connected across terminal points P6 and P7 of resistor 390 is filtering or smoothing capacitor 393, and the rectified voltage appearing across capacitor 393 is impressed on the grid circuit of the relay tube 350 which circuit includes a resistor 394.

During the operation of the system, the non-modulated polarizing voltages impressed on the rectifier grid circuits by transformers L2 and L3 remain in phase opposition to each other. However, the amplified modulated voltage impressed on the same grid circuits by transformer G, as explained in conjunction with the preceding embodiments, reverses its phase at a condition-controlled instant during each cycle of amplitude modulation. Consequently, if the polarizing voltage is substantially in phase with the amplified modulated voltage in one of the rectifier grid circuits during the first portion of the cycle period—and such a phase coincidence may be adjusted by phase adjusting devices, if necessary—then the two voltages are at the same time in phase opposition in the other grid circuit. The two phase-coincident voltages will then act cumulatively and overcome the cut-off bias of source 400 so that the appertaining rectifier tube will conduct. The other tube, however, is then non-conductive because the phase opposed alternating voltages in its grid circuit will substantially cancel each other or even increase the blocking bias. As soon as, the modulated voltage reverses its phase, the voltage conditions in the two grid circuits become also reversed so that now the first tube will stop and the second tube start conducting.

If, for instance, during the first portion of a cycle period the tube 344 is conductive, a direct current flows from source 400 through the upper half of resistor 390 to the anode 342. Point P5 has now a positive potential relative to point P6. Point P7 assumes substantially the potential of point P5 and, hence, is positive. Consequently, the grid 351 of relay tube is negative relative to cathode thus preventing the relay from firing. When the modulated voltage reverses its phase, tube 344 becomes non-conductive while now a direct current flows from source 400 through the lower portion of resistor 390 and tube 344'. As a result, point P7 has now a negative potential relative to points P5 and P6 so that the relay grid 351 is impressed by a positive bias with respect to cathode 353, thus triggering the relay tube. In summary, the rectified trigger voltage between P6 and P7 is negative during one cycle portion and positive during the other substantially in accordance with Fig. 3.

It will be recognized from the foregoing description that in both illustrated embodiments the rectifier circuits, interposed between the amplifier and the control circuit of the trigger relay, have two impedance members, represented by the secondaries 241 and 189 (Fig. 1) or the transformers G and L3 (Fig. 2), with which the rectifier circuits are coupled to the amplifier and the current supply means (oscillator) so that the rectified trigger voltage is jointly controlled by two voltages of the carrier frequency one of which reverses its phase in dependence upon the magnitude effecting the gauge means (201 or 301) while the other retains a given reference phase independently of the magnitude responded to by the gauge means.

While the foregoing description refers to rectifying tubes, it should be understood that, in principle, the invention can also be carried out with rectifiers of different kind, in particular devices of the type known as "ring modulators" and containing dry disc units, such as silicon or germanium rectifiers, preferably in bridge connection. When referring in this specification and the claims to gauge or condition-responsive control means, it is intended to include not only simple circuit devices but also more complex apparatus of any kind capable of impressing or superimposing a condition-responsive amplitude modulation on the cyclically modulated and periodically phase reversing carrier wave.

In the recording systems illustrated in the drawings, the capacitive discharge released by the relay is self-terminating and of so short a duration relative to the cycle period that the recording mechanism produces merely a dot each time the relay tube is triggered. If instead of a capacitor or other reactance a source of permanent plate current is connected to, and released by, the relay tube, then a continuous current will flow through the mechanism from the triggering moment (for instance Z1 in Fig. 3) until the end (T1) of the cycle period. Applied to a recording mechanism as illustrated, this modification has the effect of producing a line rather than a dot during each cycle, and the length of the recorded lines or their envelope curve then indicates the magnitudes of the recorded condition. The use of a source of continuous relay current is especially of advantage or necessary when the system is intended for other than recording purposes, for instance, if the mechanism to be controlled is an electromagnetic device to be energized during each cycle for an interval of time governed by the condition responded to by the gauge of the measuring circuit.

It will be understood from the foregoing that the invention permits of many and various modifications, alterations, and applications, other than those specifically described, without departure from the gist and principles of the invention and within its essential features set forth in the claims annexed hereto.

Having now particularly described and ascertained the nature of the said invention, and in what manner the same is to be performed, we declare that what we claim is:

1. An electronic control system, comprising a balanceable electric circuit having oscillator means to provide an alternating voltage and having a periodically actuated balancing device for imposing a cyclical amplitude modulation on said voltage so that the modulated voltage passes through zero under reversal of its phase at a singular instant within the period of each modulation cycle, condition-responsive gauge means forming part of said circuit for imposing another amplitude modulation on said alternating voltage to thereby displace said instant relative to said period in dependence upon the variation of a condition under observation, an amplifier connected to said circuit for amplying the modulated voltage, two controllable electronic rectifying means grid-connected to said amplifier, said oscillator means being connected to said two rectifying means to impose thereon respectively two phase-opposed voltages of the frequency of said alternating voltage, so that one rectifying means conducts during the cycle portion preceding the phase reversing instant of the modulated voltage while the other rectifying means conducts during the cycle portion subsequent to said instant, said two rectifying means having respective plate circuits, said plate circuits having a common branch and having each a resistance member, said two resistance members being series-connected with each other and having a common point attached to said branch, an electronic trigger relay having a control circuit connected across said two resistance members to trigger said relay in dependence upon change in voltage polarity occurring across said two resistance members, and electric apparatus connected to said relay to be controlled thereby and having two mechanism members movable relative to each other and driven to perform cyclical relative motion in synchronism with said cyclical amplitude modulation.

2. An electronic control system, comprising a balanceable electric circuit having alternating-current supply means to provide an alternating voltage and having a periodically operating balancing device for imposing a cyclical amplitude modulation on said voltage so that the modulated voltage passes through zero under under reversal of its phase at a singular instant of each modulation period, condition-responsive gauge means forming part of said circuit for displacing said instant relative to said period, an amplifier connected to said circuit for amplifying the modulated voltage and having an output circuit including an impedance member, an impedance member connected to said supply means to be impressed by voltage of a fixed phase relation and given amplitude relative to said alternating voltage, one of said impedance members having two series-connected sections, two rectifiers having respective pairs of electrodes and respective control circuits, said two sections of said one impedance member being connected in said respective control circuits, said control circuits having a common branch which includes said other impedance member, two series-connected resistance members having a common intermediate point and two respective terminal points, said intermediate point being connected to electrodes of the same polarity of said respective rectifiers and said terminal points being connected to said respective electrodes of the other polarity, an electronic trigger relay having a plate circuit and a control circuit, said control circuit being connected across said resistance members, and electric apparatus connected in said plate circuit to be controlled by said relay.

3. An electronic control system, comprising a balanceable electric circuit having alternating-current supply means to provide an alternating voltage and having a periodically operating balancing device for imposing a cyclical amplitude modulation on said voltage so that the modulated voltage passes through zero under reversal of its phase at a singular instant of each modulation period, condition-responsive gauge means forming part of said circuit for displacing said instant relative to said period, an amplifier connected to said circuit for amplifying the modulated voltage, two rectifiers having respective anodes and respective cathodes and respective control circuits, two impedient cathode followers series-connected with each other between said cathodes and having a common intermediate point, said control circuits having a common branch connected to said amplifier and attached to said point, two circuits connecting said respective anodes with said point and being connected to said current supply means to be impressed by mutually phase opposed voltages respectively having the frequency of said alternating voltage, an electronic trigger relay having a plate circuit and a control circuit, said control circuit being connected across said cathode followers, and electric apparatus attached to said plate circuit of said relay to be controlled thereby.

4. An electronic control system, comprising a balanceable electric circuit having alternating-current supply means to provide an alternating voltage and having a periodically operating balancing device for imposing a cyclical amplitude modulation on said voltage so that the modulated voltage passes through zero under reversal of its phase at a singular instant of each modulation period, condition-responsive gauge means forming part of said circuit for displacing said instant relative to said period, an alternating-current amplifier connected to said circuit for amplifying the modulated voltage, an electronic trigger relay having a control circuit, rectifier means connected to said control circuit to provide rectified trigger voltage therefor, said rectifier means being connected to said amplifier to be controlled by the amplified modulated voltage, circuit means connecting said rectifier means to said supply means for also controlling said rectifier means by a control voltage which has a fixed phase relation to the unmodulated alternating voltage whereby said trigger voltage has a given polarity only during that portion of said period in which the amplified modulated voltage has a given phase relation to said control voltage, and electric apparatus connected to said relay to be controlled by said relay in dependence upon the condition responded to by said gauge means.

5. An electronic control system, comprising a balanceable electric circuit having alternating-current supply means to provide an alternating voltage and having a periodically operating balancing device for imposing a cyclical amplitude modulation on said voltage so that the modulated voltage passes through zero under reversal of its phase at a singular instant of each modulation period, condition-responsive gauge means forming part of said circuit for displacing said instant relative to said period, an alternating-current amplifier connected to said circuit for amplifying the modulated voltage, an electronic trigger relay having a control circuit, rectifier means connected to said control circuit to provide rectified trigger voltage therefor, said rectifier means being connected to said amplifier to be controlled by the amplified modulated voltage, circuit means connecting said rectifier means to said supply means for also controlling said rectifier means by a control voltage which has a fixed phase relation to the unmodulated alternating voltage whereby said trigger voltage has a given polarity only during that portion of said period in which the amplified modulated voltage has a given phase relation to said control voltage, and an exhibiting mechanism having a member periodically movable in synchronism with said cyclical amplitude modulation and being electrically connected to said relay to perform an exhibiting action during said periods each instant said relay is triggered so that the position of said movable member at said instant is indicative of the condition responded to by said gauge means.

6. With exhibiting mechanism having two members capable of movement relative to each other in two coordinate directions and having drive means connected with one of said members to impart thereto cyclical movement in one of said directions, in combination, a balanceable measuring circuit having condition-responsive gauge means to vary the balance condition of said circuit in response to a variable physical quantity under observation and having a cyclically variable circuit member in connection with said drive means for cyclically varying said balance condition between given positive and negative values in synchronism with said cyclical movement of said member so that said circuit passes periodically through balance at an instant dependent upon said quantity, oscillator means of a frequency higher than that of said cyclical movement connected with said circuit, an alternating-current amplifier having input leads connected with said circuit to be impressed by voltage of said frequency modulated by said circuit member and gauge means, rectifying means connected with said amplifier and having an output circuit to provide a direct-current voltage having an abrupt change in magnitude at said instant, an electronic trigger relay having a grid circuit connected with said rectifier to be triggered by said change and having an output circuit connected with said mechanism to cause an exhibiting action at said instant.

7. With exhibiting mechanism having two members capable of movement relative to each other in two coordinate directions and having drive means connected with one of said members to impart thereto cyclical movement in one of said directions, in combination, a balanceable measuring circuit having condition-responsive gauge means to vary the balance condition of said circuit in response to a variable physical quantity under observation and having a cyclically variable circuit member in connection with said drive means for cyclically varying said balance condition between given positive and negative values in synchronism with said cyclical movement of said member so that said circuit passes periodically through balance at an instant dependent upon said quantity, oscillator means connected with said circuit and having a frequency of a higher order of magnitude than said cyclical movement, amplifying means having input leads connected with said circuit to be impressed by voltage of said frequency modulated by said circuit member and gauge means, rectifying means connected with said amplifying means and having output leads, resistance means connected across said output leads and capacitive circuit connected across said resistance means to provide across said resistance means a substantially continuous direct-current voltage having an abrupt change in magnitude at said instant, an electronic relay tube having a grid circuit connected with said resistance means to be triggered by said change and having an output circuit connected with said mechanism to cause an exhibiting action at said instant.

8. With a recording mechanism having a cyclically revolvable chart member and a progressively movable stylus member, in combination, a balanceable measuring circuit having condition-responsive gauge means to vary the balance condition of said circuit in response to a variable physical quantity under observation and having a cyclically variable circuit member synchronized with said chart member for varying said balance condition so that said circuit passes periodically through balance at an instant dependent upon said quantity, oscillator means of a frequency higher than that of said cyclical movement connected with said circuit, an alternating-current amplifier having input leads connected with said circuit to be impressed by voltage of said frequency modulated by said circuit member and gauge means, rectifying means connected with said amplifier and having an output circuit to provide a direct-current voltage having an abrupt change in magnitude at said instant, an electronic trigger relay having a grid circuit connected with said rectifier to be triggered by said change and having an output circuit connected with said stylus member for controlling it to recordingly operate at said instant.

GEORGE KEINATH.
REINHARD K. HELLMANN.

REFERENCES CITED

The following references are of record in the file of this patent:

UNITED STATES PATENTS

| Number | Name | Date |
|---|---|---|
| 2,321,605 | Keinath | June 15, 1943 |
| 2,452,023 | Wild | Oct. 19, 1948 |

OTHER REFERENCES

A. P. C. S. N. 416,911, Jacobi (published by A. P. C.) May 25, 1943.